United States Patent [19]

Kimura et al.

[11] Patent Number: 4,609,163
[45] Date of Patent: Sep. 2, 1986

[54] AUTOMATIC FILM WINDING DEVICE

[75] Inventors: Hiroyuki Kimura; Mutsunobu Yazaki; Tateo Yamada, all of Kanagawa, Japan

[73] Assignee: Canon Kabushiki Kaisha, Tokyo, Japan

[21] Appl. No.: 786,173

[22] Filed: Oct. 9, 1985

Related U.S. Application Data

[63] Continuation of Ser. No. 601,739, Apr. 19, 1984, abandoned, which is a continuation of Ser. No. 368,031, Apr. 13, 1982, abandoned.

[30] Foreign Application Priority Data

Apr. 17, 1981 [JP] Japan ............................ 56-58047

[51] Int. Cl.$^4$ ........................................... B65H 75/28
[52] U.S. Cl. ........................................ 242/71; 242/74
[58] Field of Search ........................ 242/74, 71–71.7, 242/195

[56] References Cited

U.S. PATENT DOCUMENTS

| | | | |
|---|---|---|---|
| 3,282,521 | 11/1966 | Schuller et al. | 242/74 X |
| 3,484,053 | 12/1969 | Rehn et al. | 242/74 |
| 4,274,726 | 6/1981 | Yoneyama et al. | 242/71.1 X |
| 4,275,855 | 6/1981 | Wakabayashi | 242/74 X |

Primary Examiner—John M. Jillions
Attorney, Agent, or Firm—Toren, McGeady, Stanger, Goldberg & Kiel

[57] ABSTRACT

A device for loading film wherein the narrow leader of the film is wound up on a takeup spool having a frictional member provided in a portion of the outer periphery thereof, while its edge opposite to that which has perforations is pressed against the frictional member, whereby the film leader is impelled towards the flank of the spool as the inside edge of the film leader on the aforesaid frictional member moves faster than the opposite edge. After one turn of the film leader around the spool, the outer corner of the end of the film leader is conducted so as not to engage perforations of the following area of the film.

6 Claims, 9 Drawing Figures ary wound on the spool will engage in
AUTOMATIC FILM WINDING DEVICE This is a continuation of application Ser. No. 601,739, filed Apr. 19, 1984, now abandoned, which is a continuation of application Ser. No. 368,031 filed Apr. 13, 1982, now abandoned.

BACKGROUND OF THE INVENTION

1. Field of the Invention

This invention relates to film winding devices with means for preventing the corner of a film leader from engaging overlapping perforations of the film after the film has turned around the spool one or more turns.

2. Description of the Prior Art

Conventionally, automatic film winding devices for cameras have generally been made such that the narrow leader of the film is manually placed on the takeup spool and, when the back cover is closed, it is then automatically caught up on the spool with the help of a pressure roller as the film transportation mechanism starts to operate. In this type of winding device, however, because the pressure roller is constructed with large diameter portions in the upper and lower ends thereof by which the film is pressed against the spool, there is a tendency for it to act on only one of the edges of the film, or on the lower edge (under the normal loading condition) as far as the film leader is concerned. Therefore, the use of a peripheral speed on the spool faster than on the sprocket as is well known in the art of cameras in combination with such means as described above leads to a pull on the film only in the lower edge so that the peripheral speed of the lower edge is greater than that of the upper edge and the film leader is helically convoluted on the spool as illustrated by dot-and-dash lines in FIG. 1.

Upon occurrence of this phenomenon, the lower corner 7a' of the film leader 7a after having made one turn around the spool 1 bites into the following perforations of the film as illustrated in FIG. 2 with the formation of a closed round loop of far larger diameter than that of the takeup spool 1 to thereby develop a gap, g, between the film and the spool as illustrated in FIG. 3. Thus, when more of the film is fed, the outer periphery of the convoluted film contacts with the wall of the takeup spool chamber and as a result no more film can be wound up.

Also, as illustrated in FIG. 4, the winding means may be otherwise constructed by providing teeth 2 on the periphery of the lower flank of the spool 1 to assist in making sure the film leader is engaged by the teeth 2 engaging the perforations of the film (as, for example, in the Konica PS-1 and Fujica Auto 5 cameras). In this case, as the film is pulled by one or two of the teeth 2, a front portion of the film leader ahead of the perforations which engages the tooth 2 floats up from the spool 1 as illustrated in FIG. 4 and tends to move away from the spool 1. Along with this, because the film leader 7a has perforations only in the lower vicinity, the lower edge of film is driven to move at a faster speed than the peripheral speed of the upper edge. Even in this example, therefore, as in the above, the film leader is caused to convolute helically on the spool as illustrated in FIG. 1. Also in the case of this example, there is a high probability that the lower corner 7a' of the narrow film leader 7a after having turned around the spool will engage in the following perforations 8.

Attempts have been made to eliminate the above-described drawbacks by providing a frictional member on the outer periphery of the spool against which the film is pressed by a roller so that as the film leader is impelled laterally to move to the outside, the film leader corner can shift in position so as not to engage the perforations of the following area of film (as, for example, employed in the Konica FS-1 camera). Cameras of this type use a spool such as that disclosed in U.S. Pat. No. 4,274,726, wherein a larger diameter portion is provided at the end of the spool on which the film is directly wound in contact therewith. Since spools of this type involve differences in the diameter thereof, by which diameter differences the film leader is made to move laterally, the spool itself is complicated in structure, and the frictional member and the roller too must be provided for the respective portions of the spool which have different outer diameters, thus giving rise to disadvantages in that difficult production techniques are required and that the production cost is also considerably increased.

SUMMARY OF THE INVENTION

A first object of the invention is to provide the spool with a frictional member in a portion of the outer periphery thereof against which the upper edge of the narrow film leader is pressed as it becomes engaged, whereby the film is pulled at the center of the width thereof so as to give to the film some deflection which results in forcibly moving the end of the film leader in a predetermined direction along the width thereof. Thus, the film leader corner is conducted to a position so as not to engage in the following perforations of the film as the peripheral speeds of the upper and lower edges of the film are differentiated from each other.

A second object of the invention is to provide for the spool teeth for engagement with the perforations of the film with a similar means to that described in connection with the first object, whereby a front portion of the film leader ahead of the leading perforations which engage the respective ones of the teeth is prevented from turning in a direction so as to lift up from the spool.

DETAILED DESCRIPTION OF THE PREFERRED EMBODIMENT

Figure 5:
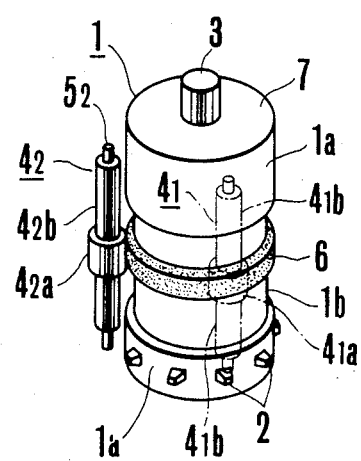
FIG. 5 is a perspective view illustrating a relationship between a spool employing one form of the present invention and a pressure roller.

The present invention will be described in connection with embodiments thereof by reference to FIGS. 5 to 9. FIG. 5 illustrates a spool 1 having teeth for engagement with the perforations of the film and two rollers $4_1$ and $4_2$ made of, for example, metal, (in FIG. 5, the roller $4_1$ is indicated by dashed lines) for pressing the film against the spool. The spool 1 comprises upper and lower cylindrical body portions 1a and a circumferential recessed or escape portion 1b of smaller diameter therebetween, the lower cylindrical body portion 1a being provided with teeth 2 to engage the perforations of the film, and the escape portion 1b being provided with an annular frictional member 6 of which the outer peripheral surface is of the same diameter as the body portions 1a and positioned in alignment with the upper edge of the narrow film leader. The rollers $4_1$ and $4_2$ each have a central portion of large diameter $4_1a$, or $4_2a$ and two flank portions of small diameter $4_1b$, or $4_2b$.

Figure 6:
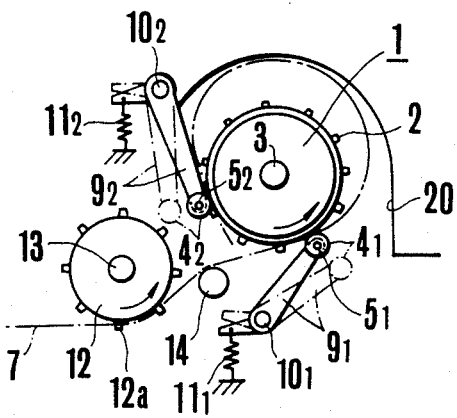
FIG. 6 is a top plan view of a film winding mechanism in the device of the invention.
Figure 7:
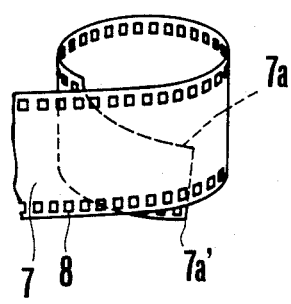
FIG. 7 is a perspective view illustrating the center deflection of the closed loop of the film according to the invention.

FIG. 6 in a top plan view illustrates a film winding up mechanism employing the spool 1 and rollers $4_1$ and $4_2$. In a spool chamber 20 the spool 1 is rotatably mounted on a shaft 3 at the center thereof. The rollers $4_1$ and $4_2$ are rotatably mounted with their shafts $5_1$ and $5_2$ on free ends of levers $9_1$ and $9_2$ respectively. These levers $9_1$ and $9_2$ are pivotally mounted on respective shafts $10_1$ and $10_2$ which take their place outside the spool chamber 20. Springs $11_1$ and $11_2$ urge the levers $9_1$ and $9_2$ to turn in a counterclockwise direction as viewed in FIG. 6 so that the pressure rollers $4_1$ and $4_2$ abut against the outer periphery of the spool 1. A sprocket 12 rotates in driven connection with a film transportation mechanism (not shown) so that the film 7 is fed into the spool chamber 20 through a guide roller 14.

In the operation of the film winding mechanism of the construction dicussed above when a film transportation mechanism (not shown) is driven to move from the outside of the camera, a driving torque transmission system (not shown) drives the spool shaft 3 and the sprocket shaft 13 to rotate. Ordinarily, to advance the film through the length of one frame, the sprocket shaft 13 turns one revolution, while the spool shaft 3 simultaneously turns more than one revolution. For this purpose, the spool 1 is friction-connected to the shaft 3 so that the amount of surface movement of the spool exceeding the length of film fed by the sprocket 12 is absorbed by the friction clutch as it slips so as to adjust the amount of surface movement of the spool.

When the sprocket 12 rotates in a direction indicated by the arrow, as one of the sprocket teeth 12a engages the perforations 8 of the film, the front end of the film 7 enters past the guide roller 14 into the spool chamber 20. When it arrives at the spool 1, the first roller $4_1$ presses it against the outer periphery of the spool 1. At this time, if the film 7 is caught up by the teeth 2 engaging the perforations 8, the film 7 is tightly convoluted on the spool 1 as it advances. If the engagement of the perforations 8 by the teeth 2 is missed, the film 7 advances and is guided by the inside wall of the spool chamber 20 and then by the side edge of the lever $9_2$, thus directing the film again at the spool 1. Then, the second roller $4_2$ presses it against the outer periphery of the spool 1 to make sure the teeth 2 engage the perforations 8. The narrow leader 7a of the film 7 immediately extends against the inner side of the following film which is fed by the sprocket 12 due to the position of the roller $4_2$ as determined relative to the following area of film. Thus, engagement of the narrow leader of the film by the spool 1 is achieved without the risk of disengagement from the teeth 2.

Figure 1:
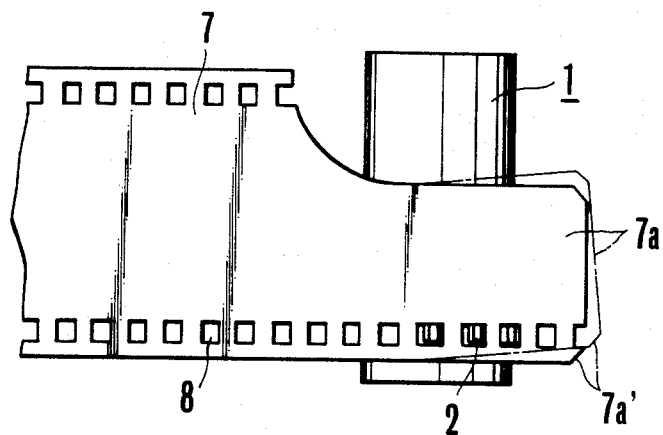
FIG. 1 is an elevational view of a spool of the conventional device showing the film leader just after it is engaged.
Figure 2:
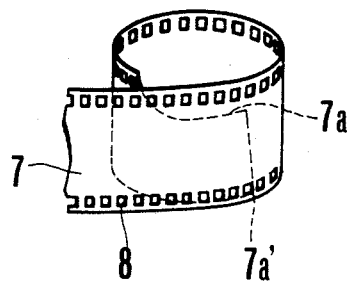
FIG. 2 is a perspective view of one turn of the film around the spool (not shown).
Figure 3:
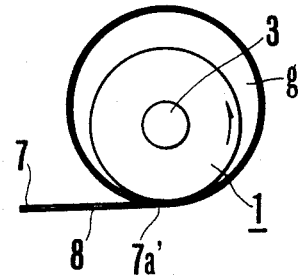
FIG. 3 is a top view illustrating a relationship between the closed loop of the film and the spool.
Figure 4:
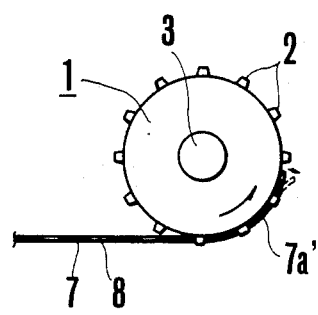
FIG. 4 is a top plane view of a spool having teeth for engaging the perforations of the film with the film leader just after engagement.
Figure 8:
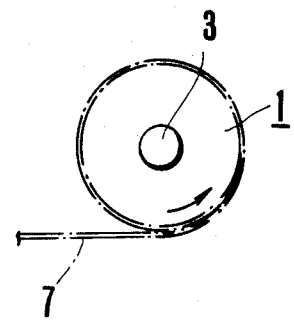
FIG. 8 is a top plan view of a tightly convoluted film on the spool as a result of the center deflection effect.

It will be appreciated that the aforesaid type of spool 1 takes up the film 7 by the rollers $4_1$ and $4_2$ cooperating with the frictional member 6 to assist in engagement of the narrow film leader 7a while preventing the end of the film leader from projecting upwards as illustrated in FIG. 4. Such arrangement of the frictional member 6 and the rollers $4_1$ and $4_2$ for pulling the film at the upper edge of the narrow film leader has another advantage in that as the lower edge of the film moves at a slower speed, the film leader is impelled sidewards and, in this instance, downwards to prevent the lower corner of the film leader from engaging in the perforations of the following area of the film after one turn around the spool thus permitting smooth winding up of the film on the spool 1, as illustrated in FIG. 8.

Figure 9:
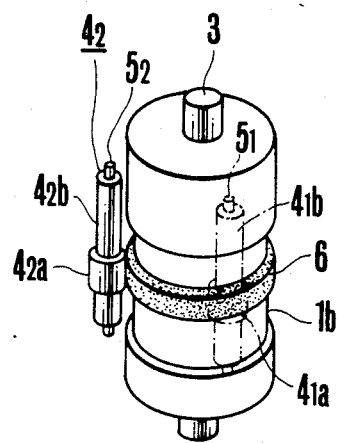
FIG. 9 is a perspective view of another embodiment of the spool with the pressure roller according to the present invention.

FIG. 9 illustrates another example of the spool 1 which has no teeth for engagement with the perforations 8 and, therefore, makes use of the frictional member 6 not only in effecting deflection but also in engagement of the film on the spool 1 in cooperation with the rollers $4_1$ and $4_2$ (the roller $4_1$ is indicated by dashed lines). The spool 1 comprises upper and lower cylindrical body portions 1a and a frictional member 6 of the same diameter as that of the portions 1a with two circumferential recesses 1b on either side of the frictional member 6. The rollers $4_1$ and $4_2$ each have a portion of large diameter $4_1a$, or $4_2a$ engaging on the frictional member 6 under pressure. These parts 1, $4_1$ and $4_2$ are arranged in a similar fashion to that illustrated in FIG. 6 in the spool chamber 20 to constitute part of the film transportation mechanism. With the device of such construction similar to that illustrated in FIGS. 5 and 6, with the narrow film leader being allowed to form a closed loop with a deflection, the film is advanced without causing the film leader corner to bite into the perforations of the following area of the film.

It is to be noted that the rollers $4_1$ and $4_2$ in the aforesaid embodiments may be modified to a taper roller with the largest diameter at the center of the length thereof so that the pressure is applied to the center of the width of the film to effect the production of a difference in the peripheral speed.

As has been described in greater detail above, the present invention provides an automatic film winding device with means rendering it possible to impel the narrow film leader slightly sidewards in a predetermined direction in one turn around the spool, thus offsetting the lower corner of the film leader from the perforations row in the lower vicinity of the film when a closed loop of the film is formed. Therefore, it is made possible to avoid that the film fed into the takeup spool chamber will be jammed due to the engagement of the lower film leader corner in the perforations in the following area of the film. It should be pointed out here that the formation of a closed loop of the film leader around the spool with a deflection can be realized without the necessity of using different outer diameters in the spool on which the film is wound directly in contact therewith for the purpose of producing the deflection effect, and also without requiring different dimensions of the frictional member and the pressure rollers depending upon the position of the axial length of the spool, thereby providing the advantage that an unduly complicated structure is not necessarily involved, and low unit cost production techniques may be employed.

While specific embodiments of the invention have been shown and described in detail to illustrate the application of the invention principles, it will be understood that the invention may be embodied otherwise without departing from such principles.

What is claimed is:

1. An automatic film winding device for a camera comprising:
    a film takeup spool for winding film, said film having a leader narrower than said film at one end of said film, said spool having a friction member provided to extend over at least a predetermined position approximately at the center of said spool for exerting a frictional force upon said film, said spool having its largest outer diameter at said predetermined position; and
    pressure means for pressing one side portion of said narrowed leader on said friction member at said predetermined position, said pressure means causing said one side portion of said film, which contacts said friction member to run at a faster speed than a side portion of said film opposite said one side portion.

2. A device according to claim 1 wherein said pressure means includes a roller.

3. A device according to claim 2 wherein said pressure means includes a spring member which urges said roller in the pressing direction.

4. A device according to claim 1 wherein said pressure means is arranged to ensure that said leader at the end of said film comes under a subsequent portion of said film immediately as said leader runs in a single revolution around said spool.

5. A device according to claim 1 wherein said said spool has an engaging portion for engaging with perforations of said film.

6. A device according to claim 1, further comprising a spool chamber for housing said takeup spool, said pressure means comprising at least two pressure members within said spool chamber with the positions at which said pressure members are provided being at a location where the film enters into said spool chamber and a location at which the film exits from said chamber.

* * * * *